United States Patent [19]

Cirincione

[11] 3,886,535

[45] May 27, 1975

[54] APPARATUS FOR DETECTING FLAMMABLE VAPORS AND CONTROLLING STARTING COIL OF IGNITION SYSTEM

[76] Inventor: Thomas Cirincione, 144-08 32nd Ave., Flushing, N.Y. 11354

[22] Filed: July 19, 1973

[21] Appl. No.: 380,755

[52] U.S. Cl. ............................... 340/237 R; 307/9
[51] Int. Cl. ........................................... G08b 21/00
[58] Field of Search ........... 340/237 R, 29; 307/116, 307/9; 23/254 E, 255 E; 73/27 R

[56] References Cited
UNITED STATES PATENTS

| | | | |
|---|---|---|---|
| 3,489,912 | 1/1970 | Hoffman, Jr. | 307/9 |
| 3,599,591 | 8/1971 | Edelson | 307/116 X |
| 3,631,436 | 12/1971 | Taguchi | 340/237 R |
| 3,789,231 | 1/1974 | Hayden | 340/237 R X |

Primary Examiner—John W. Caldwell
Assistant Examiner—Daniel Myer
Attorney, Agent, or Firm—Joel Halpern

[57] ABSTRACT

Apparatus for detecting the presence of flammable vapors and for controlling the starter coil of the ignition system of an internal combustion engine in accordance with the result thereof. A multiple position switch is adapted to couple a source of current to visual and/or audible indicating means to indicate the operational status of the system. Time delay means is adapted to be coupled to the switch to provide a first segment of a series current path for the starter coil after a predetermined period of time and means are provided for furnishing the remaining segment of said series current path. Sensor means sense the presence of flammable vapors and are adapted to open the said remaining segment of the series current path upon the detection of such vapors and to maintain the said remaining segment of the current path completed in the absence of any such vapors, said series current path to the starter coil thus remaining open during the sensor warm-up period and when the indicating means indicate the non-operational status of the system.

8 Claims, 3 Drawing Figures

PATENTED MAY 27 1975  3,886,535

APPARATUS FOR DETECTING FLAMMABLE VAPORS AND CONTROLLING STARTING COIL OF IGNITION SYSTEM

BACKGROUND OF THE INVENTION

It was heretofore known to provide apparatus for the detection of flammable vapors in a prescribed zone and to offer visual and/or audible indicating means to signal the presence of such vapors. It was also known to provide a blower connected electrically with the detection apparatus for clearing the monitored zone of any accumulated vapors. U.S. Pat. No. 2,533,339 granted Dec. 12, 1950 to W. J. Willenborg may be referred to for details of such flammable vapor detection and control apparatus. The Willenborg patent also teaches the monitoring of areas such as the bilge of a ship or motor boat utilizing such a system. U.S. Pat. No. 3,041,591 granted June 26, 1962 to P. J. Moore discloses the provision of detecting apparatus in which a flammable gas sensing unit is connected with a Wheatstone bridge and to a voltmeter indicator to signal the presence of the vapor in a remotely located zone, an air pump being utilized to withdraw gas and vapor from the bilge compartment of a boat for passage through the sensing unit in order to provide remote sensing. The Moore patent further teaches the substitution of an audible or other indicator for the voltmeter if so desired.

Despite the availability of flammable vapor detection and alarm or control systems, such as disclosed in the Willenborg and Moore patents, there has remained a need for a simple yet foolproof ignition control system for internal combustion engines operable in environments where flammable vapors may be present. Further, systems such as taught by Willenborg have utilized gas sensing devices in which a resistive element, i.e., a bare wire, increases in temperature through catalytic action in the presence of the gases or vapors to be detected. Such increased temperature is accompanied by a corresponding increase in electrical resistance. The resistive element is combined with a balancing Wheatstone bridge, galvonometer and ammeter to provide the detector. However, it will be appreciated that there is an inherent danger in employing such devices unless the sensing element is turned off promptly upon the detection of vapors. Failure to switch off the sensing element before it reaches its glow temperature can lead to the very explosion sought to be avoided by resort to the detector. The detector cannot be employed again in the same environment until the vapors have been cleared from the zone being monitored or until the resistive element has been permitted to cool below its glow temperature. It will thus be seen that the prior detection systems suffered from certain inherent deficiencies and thus the need remained for a system free from such liabilities.

Applicant has furthermore determined that there is a particular need for an ignition control system in the marine field, especially in connection with the operation of an inboard internal combustion engine. There is frequently a substantial danger of explosion on boats powered with such engines due to the accumulation of dangerous gasoline fumes or of alcohol or propane fumes emitted by the cooking or heating equipment carried on the boat. It has been customary to thoroughly "air" out the boat prior to turning on the ignition for the engine; however, human error or failure to observe adequate safety procedures has led to mishaps heretofore due to the starting of the inboard engine in the presence of flammable vapors with consequent injury or death to the occupants of the boat.

SUMMARY OF THE INVENTION

It is, therefore, one object of the present invention to provide an ignition control system for an internal combustion engine which incorporates a flammable vapor detection device and indicating means for indicating when the engine may be safely started.

It is another object of this invention to provide an ignition control system for an inboard marine engine which includes a flammable vapor detector and which prevents activation of the engine starter coil if flammable vapors have been detected.

It is still another object of the present invention to provide an ignition control system for an internal combustion engine which includes a solid-state flammable-vapor detector incapable of inadvertent engine start-up in the presence of flammable vapors.

According to the present invention there is provided apparatus for detecting the presence of flammable vapors and for controlling the starter coil of the ignition system of an internal combustion engine in accordance with the result thereof, said apparatus comprising:

a. indicating means for indicating the operational status of said ignition system;

b. source of current for activation of said starter coil;

c. switch means adapted to couple said source of current to said indicating means in accordance with the selected position of said switch;

d. time delay means adapted to be coupled to said switch means to provide a first segment of a series current path for said starter coil after a predetermined period of time;

e. means for providing the remaining segment of said series current path for said starter coil; and f. sensor means for sensing the presence of flammable vapors and adapted to open said remaining segment of said series current path upon the detection of flammable vapors and to maintain said remaining segment of said series current path completed in the absence of flammable vapors, whereby said indicating means provides at least a visual signal signifying the status of the system as being in a condition selected from (1) warm-up period, (2) ignition-ready and (3) non-operational, said series current path to said starter coil thereby remaining open during the warm-up and non-operational conditions to thus prevent accidental activation of the starter coil.

BRIEF DESCRIPTION OF THE DRAWINGS

In order that the invention may be more fully understood it will now be described, by way of example, with reference to the accompanying drawings in which.

DETAILED DESCRIPTION OF THE INVENTION

Figure 1:
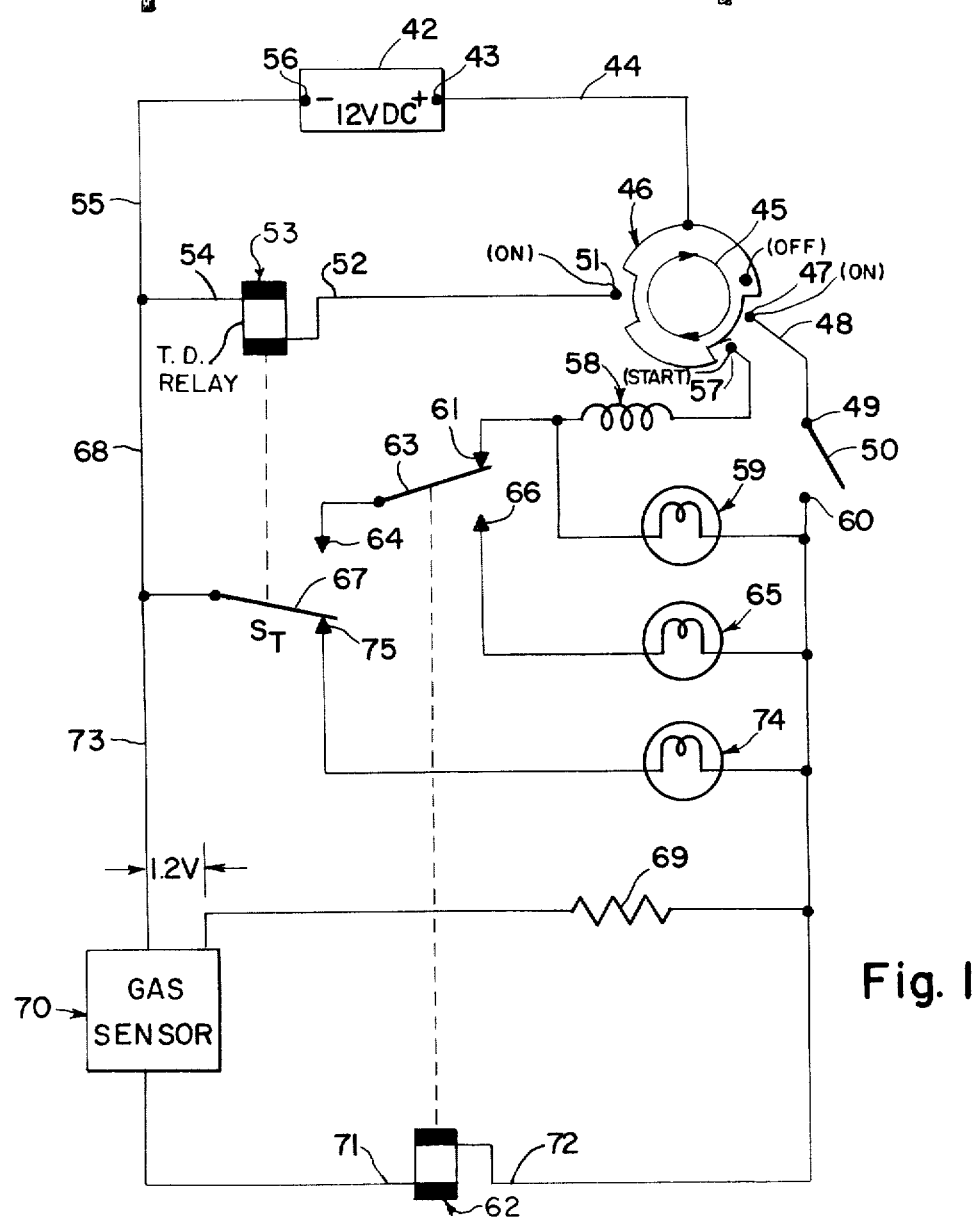
FIG. 1 is an electrical schematic circuit diagram of the ignition control system and flammable vapor detector of the invention in its preferred form.

Referring to FIG. 1 of the drawings there is shown a source of voltage 42 which is conventionally the storage battery of the vehicle in which the internal combustion engine to be controlled is installed. Typically, the battery is of the 12 volt type normally used to start an inboard marine engine (not shown). One terminal (+) 43 of the battery is coupled by means of lead wire 44 to rotatable contact ring 45 of an ignition switch 46. The ON terminal 47 of the ignition switch is connected, via lead 48, to one terminal 49 of a single pole single throw (SPST) power ON-OFF switch 50 which is manually operable. A second ON terminal 51 of the ignition switch is connected to one side 52 of the heater element of a thermal time delay relay 53 which, in the presently preferred embodiment, is given a time delay setting of between two and three minutes before the relay becomes operational. The other side 54 of relay 53 is connected, via lead 55, to the other (−) terminal 56 of the battery 42. The START terminal 57 of the ignition switch is connected, via a starter coil 58 and a green indicating lamp 59 to the other terminal 60 of power switch 50. No electrical connection is made between contact ring 45 and terminals 47, 57 and 51 until the contact ring of the ignition switch is rotated. It will, of course, be appreciated that in place of a multiple position switch one may substitute, for example, a single position rotary switch in conjunction with a push-pull switch or other equivalent switching means.

The common connection between lamp 59 and starter coil 58 is connected to a normally closed contact terminal 61 of a control relay 62. Relay 62 is provided with a movable contact arm 63 which is connected to a normally open contact terminal 54 of thermal time delay relay 53.

A red indicating lamp 65 is connected from terminal 60 of switch 50 to the normally open contact terminal 66 of the control relay 62. An amber indicating lamp 74 is connected from terminal 60 of switch 50 to the normally closed contact terminal 75 of the thermal time delay relay 53. Relay 53 is provided with a movable contact arm 67 which is connected to the negative terminal (−) 56 of battery 42 via a lead 68 to provide together with contact terminal 64 the first segment of a series current path to the starter coil 58.

A dropping resistor 69 is connected to a heater element (not shown) associated with a gas sensor 70. Gas sensor 70 is, according to the presently preferred embodiment of the invention, a solid-state semi-conductor device which is adapted to have its electrical conductivity substantially increased through the absorbtion of a deoxidizing gas or vapor such as comprise the flammable gases or vapors normally encountered on a boat, e.g. gasoline, alcohol, propane, etc. A suitable gas sensor currently available is the TGS (Taguchi Gas Sensor) sold by Figaro Engineering, Inc. of Osaka, Japan. The heater element of the gas sensor, in the presently preferred embodiment, requires 1.2 volts; thereby occasioning the employment of dropping resistor 69 to reduce the 12 volts of battery 42 to the 1.2. volts to be applied to the heater element of the gas sensor. The heater element is adapted, in conjunction with associated circuitry (not shown), to permit the sensor to warm-up while it serves as a switch remaining open until it reaches its operating temperature. The sensor is connected to one terminal 71 of control relay 62, the other terminal 72 of the control relay being connected to terminal 60 of switch 50. The gas sensor 70 is also connected via leads 73, 68 and 55 to the negative terminal 56 of the battery.

Although the preferred embodiment has been described in connection with only visual indicating means such as lamps 59, 65 and 74 it will be understood that it is within the concept of the invention to provide audible signal means either in substitution of the lamps or to augment same.

The relays utilized are preferably of the sealed type to contain any possible arcing of the contacts which may occur. Further, it is preferred that a fine mesh shield be provided over the gas sensor in order to preclude any possibility of explosion of the flammable vapors by the heater element thereof.

Figure 2:
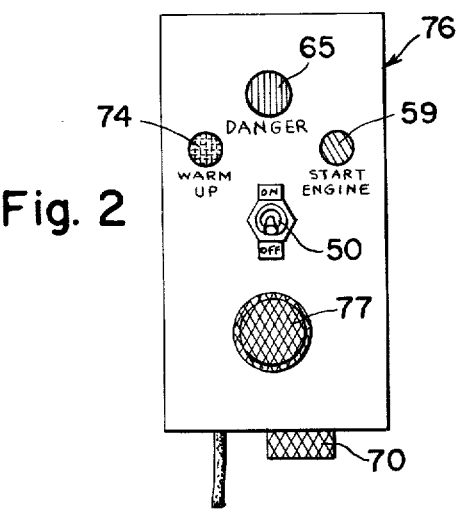
FIG. 2 is a front view of the "ignition sentry" panel unit.
Figure 3:
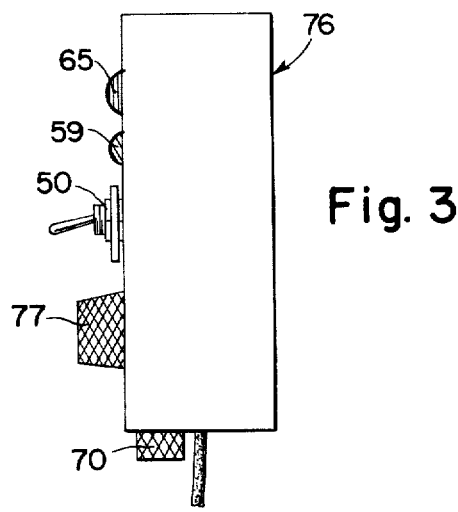
FIG. 3 is a side view of the panel unit illustrated in FIG. 1.

FIGS. 2 and 3 depict the ignition control system, except for the starter coil and ignition switch, as being embodied in a suitable rectangular housing 76 which may be formed of sheet metal or of a plastic material. The front panel is provided with indicator lamps 59, 65 and 74 as well as with a manual on-off power switch. The switch is adapted to turn off the device in order to conserve battery power once the engine has been started. It will be appreciated that when audible signals are to be provided an audible sound transducer 77 may be incorporated in the panel and wired, for example, in parallel to the branch of the circuit depicted in FIG. 1 operatively connecting the red indicating lamp. It will also be understood that additional gas sensors can be added at various remote locations such as in the engine compartment and in the below-deck compartments to provide as complete protection for the entire boat as may be desired.

In operation, the operator of the vehicle or boat will close the power ON-OFF switch 50 to complete the connection between terminals 49 and 60 thereof. Ignition switch 46 is then turned to the ON position by rotation of contact ring 45 in a clockwise direction. The battery voltage is thus applied via lead 44, contact ring 45, terminal 47, switch 50 and the dropping resistor 69 to the heater element of gas sensor 70. Since the gas sensor is initially cold it functions as a switch to close the circuit from terminal 71 of control relay 62 to the battery terminal (−) 56. Relay 62, therefore, has the battery voltage applied across same by virtue of the voltage passing through the switch 50 to terminal 72 of the control relay. This results in activation of the control relay and movement of contact arm 63 to terminal 66. Lamp 65 (red) does not immediately become illuminated because contact terminal 64 and movable arm 67 of the thermal time delay relay remain open. As long as contact terminal 64 and movable arm 67, and the series current path, of which the sensor is a segment, remain open the circuit which includes the starter coil remains open and the starter coil cannot be activated. The engine, therefore, cannot be started. Once the heater element of the gas sensor warms up the gas sensor serves as a switch to disconnect the control relay from the battery as shown in FIG. 1. At the same time the battery voltage is applied to terminal 52 of the thermal time delay relay via lead 44, contact ring 45 and terminal 51 of the ignition switch. After approximately two minutes, i.e., the delay setting of the relay 53, the thermal time delay relay is activated thereby closing contact 64 with movable arm contact 67. During the relay warm-up interval lamp 74 (amber) is illuminated since the battery voltage from (+) terminal 43 has been applied via switches 46 and 50 to the lamp 74, terminal 75, movable contact arm 67 and lead 68 to terminal (−) 56 of the battery. Once relay 53 has been activated this circuit is broken at contact 75 and the lamp 74 is extinguished.

If no flammable vapors are present in the zone being monitored by the gas sensor then contact 61 and movable arm 63 are closed since gas sensor 70 now completes the remaining series current path. Upon the closing of contact 64 and arm 67 lamp 59 (green) becomes illuminated to provide a visual indication that the engine can be started. Further rotation of contact ring 45 applies the battery voltage to starter coil 58 initiating starting of the engine. Should flammable vapors be present the gas sensor would serve to switch on control relay 62 as described earlier, thereby closing contact 66 and movable arm contact 63, illuminating lamp 65 (red) and thus providing a warning to the operator that dangerous fumes are present. In this nonoperational status even if the ignition switch is manipulated to the start position there will be no current flow through the starter coil because the current path through contact 61 and movable contact arm 63 to terminal (−) 56 of the battery will be broken.

Once the engine has been safely started lamp 59 will remain illuminated unless the operator opens switch 50 to conserve the power drain from the battery. In such event lamp 59 will be extinguished.

It will be understood that various in the details, materials, arrangement of parts, and operating conditions which have been described herein may be made by those skilled in the art within the principles and scope of the invention.

Having thus set forth the nature of the invention, what is claimed herein is:

1. Apparatus for detecting the presence of flammable vapors and for controlling the starting coil of the ignition system of an internal combustion engine in accordance with the result thereof, said apparatus comprising:
    a. indicating means for indicating the operational status of said ignition system;
    b. a source of current for activation of said starter coil;
    c. manually operable switch means adapted to couple said source of current to said indicating means in accordance with the selected position of said switch;
    d. time delay means directly connected to one terminal of said source of current and being connected solely by said switch means to another terminal of said source of current and providing a first segment of a series current path for said starter coil after a predetermined period of time;
    e. means for providing the remaining segment of said series current path for said starter coil; and
    f. sensor means exposed to flammable vapors and having a conductive state which is inversely related to the quantum of flammable vapors present for detection, said sensor means being adapted to open said remaining segment of said series current path upon the detection of flammable vapors and to maintain said remaining segment of said series current path completed in the absence of flammable vapors, whereby said indicating means provides at least a visual signal signifying the status of the system as being in a condition selected from (1) warm-up period, (2) ignition-ready, and (3) nonoperational, said time delay means providing said segment of the series current path for said starter irrespective of the conductive state of said sensor means.

2. Apparatus according to claim 1, wherein said indicating means comprises a plurality of colored lamps, each of said lamps being representative of one of said status conditions.

3. Apparatus according to claim 1, wherein said switch means comprises a multiple position ignition switch having at least two operative positions in one of which said source of current is connected (a) to said time delay means, (b) to said sensor means and (c) to said means for providing the remaining segment of said series current path, the other operative position of said switch maintaining said connections (a), (b) and (c) and also connecting said source of current to said starter coil.

4. Apparatus according to claim 3, wherein said time delay means is a thermal time delay relay, said relay during a predetermined time delay having open contacts in said series current path which automatically close after said predetermined period of time.

5. Apparatus according to claim 3, wherein a power switch is provided adapted to isolate said source of current from said sensor means and said means for providing the remaining segment of said series current path notwithstanding said ignition switch being in said two operative positions thereof.

6. Apparatus according to claim 1, wherein said means for providing the remaining segment of said series current path includes a control relay having an operating coil and multiple relay contacts, one of said relay contacts being normally closed by a movable arm controlled by said control relay in said series current path, said relay coil being provided with energizing current via said sensor means only when said sensor means detects the presence of flammable vapors at which time said movable arm engages another of the relay contacts to break said series current path independently of the operation of the time delay means.

7. Apparatus according to claim 1, wherein said sensor means comprises a reductive-type semi-conductor device formed of a metal oxide and adapted to have its conductivity increased in the presence of flammable deoxidizing vapors.

8. Apparatus according to claim 7, wherein a resistor is connected in series with said sensor means and said source of current and providing a predetermined voltage drop to ensure heating of the sensor means to a predetermined operating temperature, said time delay means providing a delay sufficient to ensure said sensor means reaching said predetermined temperature.

* * * * *